(12) United States Patent
Kussel

(10) Patent No.: US 9,681,062 B2
(45) Date of Patent: Jun. 13, 2017

(54) VEHICLE CAMERA IMAGE QUALITY IMPROVEMENT IN POOR VISIBILITY CONDITIONS BY CONTRAST AMPLIFICATION

(71) Applicant: MAGNA ELECTRONICS INC., Auburn Hills, MI (US)

(72) Inventor: Marcel Kussel, Aschaffenburg (DE)

(73) Assignee: MAGNA ELECTRONICS INC., Auburn Hills, MI (US)

(*) Notice: Subject to any disclaimer, the term of this patent is extended or adjusted under 35 U.S.C. 154(b) by 460 days.

(21) Appl. No.: 14/343,937

(22) PCT Filed: Sep. 25, 2012

(86) PCT No.: PCT/US2012/057007
§ 371 (c)(1),
(2) Date: Mar. 10, 2014

(87) PCT Pub. No.: WO2013/048994
PCT Pub. Date: Apr. 4, 2013

(65) Prior Publication Data
US 2014/0232872 A1    Aug. 21, 2014

Related U.S. Application Data

(60) Provisional application No. 61/539,049, filed on Sep. 26, 2011.

(51) Int. Cl.
*H04N 5/243* (2006.01)
*B60R 1/00* (2006.01)

(52) U.S. Cl.
CPC .............. *H04N 5/243* (2013.01); *B60R 1/00* (2013.01); *B60R 2300/307* (2013.01); *B60R 2300/8053* (2013.01)

(58) Field of Classification Search
CPC ...... B60R 2300/00–2300/108; B60R 2300/30; B60R 2300/60; B60R 2300/80–2300/8093
See application file for complete search history.

(56) References Cited

U.S. PATENT DOCUMENTS

| 4,973,844 A | 11/1990 | O'Farrell et al. |
| 4,982,287 A * | 1/1991 | Lagoni ............... H04N 5/59 348/673 |

(Continued)

FOREIGN PATENT DOCUMENTS

EP    0353200    1/1990

OTHER PUBLICATIONS

Cromwell et al., "Contrast Enhancement through Localized Histogram Equalization", webpage located at: http://www.cromwell-intl.com/3d/histogram/.

(Continued)

*Primary Examiner* — Michael Teitelbaum
(74) *Attorney, Agent, or Firm* — Gardner, Linn, Burkhart & Flory, LLP

(57) ABSTRACT

A vision system for a vehicle includes an imaging sensor disposed at the vehicle and having an exterior field of view, and an image processor. The imaging sensor captures image data and the image processor is operable to process successive frames of captured image data. Responsive to a determination of a low visibility driving condition, the image processor increases the contrast of the captured images to enhance discrimination of objects in the field of view of the imaging sensor. The image processor may execute a first brightness transfer function on frames of captured image data to enhance the contrast of captured image data, and may execute a second brightness transfer function over successive frames of earlier captured image data and may execute a tone mapping of the earlier captured image data and the (Continued)

currently captured image data to generate a contrast enhanced output image.

20 Claims, 7 Drawing Sheets

(56) References Cited

U.S. PATENT DOCUMENTS

| | | |
|---|---|---|
| 4,987,357 A | 1/1991 | Masaki |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,059,877 A | 10/1991 | Teder |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,130,709 A | 7/1992 | Toyama et al. |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,204,778 A | 4/1993 | Bechtel |
| 5,208,701 A | 5/1993 | Maeda |
| 5,245,422 A | 9/1993 | Borcherts et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,461,357 A | 10/1995 | Yoshioka et al. |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,614,788 A | 3/1997 | Mullins et al. |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,761,094 A | 6/1998 | Olson et al. |
| 5,765,116 A | 6/1998 | Wilson-Jones et al. |
| 5,765,118 A | 6/1998 | Fukatani |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 5,959,555 A | 9/1999 | Furuta |
| 5,963,247 A | 10/1999 | Banitt |
| 5,990,469 A | 11/1999 | Bechtel et al. |
| 5,990,649 A | 11/1999 | Nagao et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,097,024 A | 8/2000 | Stam et al. |
| 6,100,799 A | 8/2000 | Fenk |
| 6,144,022 A | 11/2000 | Tenenbaum et al. |
| 6,175,300 B1 | 1/2001 | Kendrick |
| 6,201,642 B1 | 3/2001 | Bos et al. |
| 6,223,114 B1 | 4/2001 | Boros et al. |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,294,989 B1 | 9/2001 | Schofield et al. |
| 6,297,781 B1 | 10/2001 | Turnbull et al. |
| 6,310,611 B1 | 10/2001 | Caldwell |
| 6,317,057 B1 | 11/2001 | Lee |
| 6,320,282 B1 | 11/2001 | Caldwell |
| 6,333,759 B1 | 12/2001 | Mazzilli |

(56) References Cited

U.S. PATENT DOCUMENTS

| | | |
|---|---|---|
| 6,353,392 B1 | 3/2002 | Schofield et al. |
| 6,370,329 B1 | 4/2002 | Teuchert |
| 6,392,315 B1 | 5/2002 | Jones et al. |
| 6,396,397 B1 | 5/2002 | Bos et al. |
| 6,411,204 B1 | 6/2002 | Bloomfield et al. |
| 6,424,273 B1 | 7/2002 | Gutta et al. |
| 6,430,303 B1 | 8/2002 | Naoi et al. |
| 6,442,465 B2 | 8/2002 | Breed et al. |
| 6,477,464 B2 | 11/2002 | McCarthy et al. |
| 6,497,503 B1 | 12/2002 | Dassanayake et al. |
| 6,498,620 B2 | 12/2002 | Schofield et al. |
| 6,534,884 B2 | 3/2003 | Marcus et al. |
| 6,539,306 B2 | 3/2003 | Turnbull |
| 6,553,130 B1 | 4/2003 | Lemelson et al. |
| 6,594,583 B2 | 7/2003 | Ogura et al. |
| 6,611,610 B1 | 8/2003 | Stam et al. |
| 6,636,258 B2 | 10/2003 | Strumolo |
| 6,672,731 B2 | 1/2004 | Schnell et al. |
| 6,690,268 B2 | 2/2004 | Schofield et al. |
| 6,704,621 B1 | 3/2004 | Stein et al. |
| 6,711,474 B1 | 3/2004 | Treyz et al. |
| 6,730,913 B2 | 5/2004 | Remillard et al. |
| 6,735,506 B2 | 5/2004 | Breed et al. |
| 6,744,353 B2 | 6/2004 | Sjönell |
| 6,795,221 B1 | 9/2004 | Urey |
| 6,806,452 B2 | 10/2004 | Bos et al. |
| 6,819,231 B2 | 11/2004 | Berberich et al. |
| 6,823,241 B2 | 11/2004 | Shirato et al. |
| 6,824,281 B2 | 11/2004 | Schofield et al. |
| 6,850,156 B2 | 2/2005 | Bloomfield et al. |
| 6,889,161 B2 | 5/2005 | Winner et al. |
| 6,909,753 B2 | 6/2005 | Meehan et al. |
| 6,946,978 B2 | 9/2005 | Schofield |
| 6,975,775 B2 | 12/2005 | Rykowski et al. |
| 6,989,736 B2 | 1/2006 | Berberich et al. |
| 7,004,606 B2 | 2/2006 | Schofield |
| 7,038,577 B2 | 5/2006 | Pawlicki et al. |
| 7,062,300 B1 | 6/2006 | Kim |
| 7,065,432 B2 | 6/2006 | Moisel et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,123,168 B2 | 10/2006 | Schofield |
| 7,136,753 B2 | 11/2006 | Samukawa et al. |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,195,381 B2 | 3/2007 | Lynam et al. |
| 7,202,776 B2 | 4/2007 | Breed |
| 7,227,611 B2 | 6/2007 | Hull et al. |
| 7,365,769 B1 | 4/2008 | Mager |
| 7,425,076 B2 | 9/2008 | Schofield et al. |
| 7,460,951 B2 | 12/2008 | Altan |
| 7,490,007 B2 | 2/2009 | Taylor et al. |
| 7,526,103 B2 | 4/2009 | Schofield et al. |
| 7,543,946 B2 | 6/2009 | Ockerse et al. |
| 7,592,928 B2 | 9/2009 | Chinomi et al. |
| 7,639,149 B2 | 12/2009 | Katoh |
| 7,681,960 B2 | 3/2010 | Wanke et al. |
| 7,720,580 B2 | 5/2010 | Higgins-Luthman |
| 7,724,962 B2 | 5/2010 | Zhu et al. |
| 7,733,464 B2 | 6/2010 | David et al. |
| 7,855,755 B2 | 12/2010 | Weller et al. |
| 7,881,496 B2 | 2/2011 | Camilleri et al. |
| 7,952,490 B2 | 5/2011 | Fechner et al. |
| 8,013,780 B2 | 9/2011 | Lynam et al. |
| 8,027,029 B2 | 9/2011 | Lu et al. |
| 8,577,169 B2 | 11/2013 | Andrus et al. |
| 8,849,495 B2 | 9/2014 | Chundrik, Jr. et al. |
| 2002/0015153 A1 | 2/2002 | Downs |
| 2002/0113873 A1 | 8/2002 | Williams |
| 2003/0137586 A1 | 7/2003 | Lewellen |
| 2003/0222982 A1 | 12/2003 | Hamdan et al. |
| 2004/0114381 A1 | 6/2004 | Salmeen et al. |
| 2006/0017807 A1* | 1/2006 | Lee ............... B60R 1/00 348/36 |
| 2006/0018511 A1 | 1/2006 | Stam et al. |
| 2006/0018512 A1 | 1/2006 | Stam et al. |
| 2006/0091813 A1 | 5/2006 | Stam et al. |
| 2006/0103727 A1 | 5/2006 | Tseng |
| 2006/0164221 A1 | 7/2006 | Jensen |
| 2006/0171704 A1* | 8/2006 | Bingle ............... B60R 11/04 396/419 |
| 2006/0250501 A1 | 11/2006 | Widmann et al. |
| 2006/0290479 A1 | 12/2006 | Akatsuka et al. |
| 2007/0104476 A1 | 5/2007 | Yasutomi et al. |
| 2008/0094715 A1* | 4/2008 | Schofield ............... H04N 7/183 359/604 |
| 2008/0197997 A1* | 8/2008 | Vitito ............... B60Q 1/50 340/461 |
| 2009/0093938 A1 | 4/2009 | Isaji et al. |
| 2009/0113509 A1 | 4/2009 | Tseng et al. |
| 2009/0177347 A1 | 7/2009 | Breuer et al. |
| 2009/0243824 A1 | 10/2009 | Peterson et al. |
| 2009/0244361 A1 | 10/2009 | Gebauer et al. |
| 2009/0265069 A1 | 10/2009 | Desbrunes |
| 2010/0020170 A1 | 1/2010 | Higgins-Luthman et al. |
| 2010/0195901 A1* | 8/2010 | Andrus ............... H04N 5/213 382/162 |
| 2010/0228437 A1 | 9/2010 | Hanzawa et al. |
| 2012/0044066 A1 | 2/2012 | Mauderer et al. |
| 2012/0062743 A1 | 3/2012 | Lynam et al. |
| 2012/0218412 A1 | 8/2012 | Dellantoni et al. |
| 2012/0262340 A1 | 10/2012 | Hassan et al. |
| 2013/0124052 A1 | 5/2013 | Hahne |
| 2013/0129150 A1 | 5/2013 | Saito |
| 2013/0131918 A1 | 5/2013 | Hahne |
| 2014/0067206 A1 | 3/2014 | Pflug |
| 2014/0156157 A1 | 6/2014 | Johnson et al. |
| 2014/0222280 A1 | 8/2014 | Salomonsson |
| 2014/0313339 A1 | 10/2014 | Diessner et al. |
| 2014/0379233 A1 | 12/2014 | Chundrlik, Jr. et al. |

OTHER PUBLICATIONS

International Search Report and Written Opinion dated Jan. 28, 2013 from corresponding PCT Application No. PCT/Us2012/057007.

Kim et al., "An advanced contrast enhancement using partially overlapped sub-block histogram equalization," IEEE Transactions on Circuits and Systems for Video Technology, vol. 11, No. 4, Apr. 2001.

Marsi, "Real Time Video Contrast Enhancement by Using Recursive Rational Filter," Imaging Systems and Techniques, 2004, Abstract.

Oakley et al., "Improving Image Quality in Poor Visibility Conditions Using a Physical Model for Contrast Degradation," IEEE Transactions on Image Processing, Feb. 1998, Abstact.

Qing Wang, "Real Time Video Contrast Enhancement by Using Recursive Rational Filter," IEEE Transactions on Consumer Electronics, May 2007, Abstract.

Stark et al., "Gray and Color Image Contrast Enhancement by the Curvelet Transform," IEEE Transactions on Image Processing, vol. 12, No. 6, Jun. 2003.

* cited by examiner

VEHICLE CAMERA IMAGE QUALITY IMPROVEMENT IN POOR VISIBILITY CONDITIONS BY CONTRAST AMPLIFICATION

CROSS REFERENCE TO RELATED APPLICATIONS

The present application is a 371 national phase filing of PCT Application No. PCT/US2012/057007, filed Sep. 25, 2012, which claims the filing benefit of U.S. provisional application Ser. No. 61/539,049, filed Sep. 26, 2012, which is hereby incorporated herein by reference in its entirety.

FIELD OF THE INVENTION

The present invention relates to imaging systems or vision systems for vehicles.

BACKGROUND OF THE INVENTION

Use of imaging sensors in vehicle imaging systems is common and known.

Examples of such known systems are described in U.S. Pat. Nos. 5,877,897; 5,796,094; 5,670,935; and/or 5,550,677, which are hereby incorporated herein by reference in their entireties.

SUMMARY OF THE INVENTION

The present invention provides a vision system or imaging system for a vehicle that utilizes one or more cameras to capture images exterior of the vehicle, such as forwardly or rearwardly of the vehicle, and provides for enhanced image processing to detect objects in poor visibility conditions, such as in dense fog or the like.

The vision system may enhance the image processing by amplifying the contrast in the captured images by brightness transfer function filtering and exposure stacking and tracking contrast thresholds or features within the captured images, such as on a frame-by-frame basis as the vehicle travels along a road.

These and other objects, advantages, purposes and features of the present invention will become apparent upon review of the following specification in conjunction with the drawings.

BRIEF DESCRIPTION OF THE DRAWINGS

FIGS. 3(a) and 3(b) show graphs showing histograms of luminance distribution for the vision system, with FIG. 3(b) showing the histogram of the original image's graph of FIG. 3(a) as spread into the highest possible dynamic range of the target system which equates to a contrast amplification of the present invention;

DESCRIPTION OF THE PREFERRED EMBODIMENTS

Figure 1:
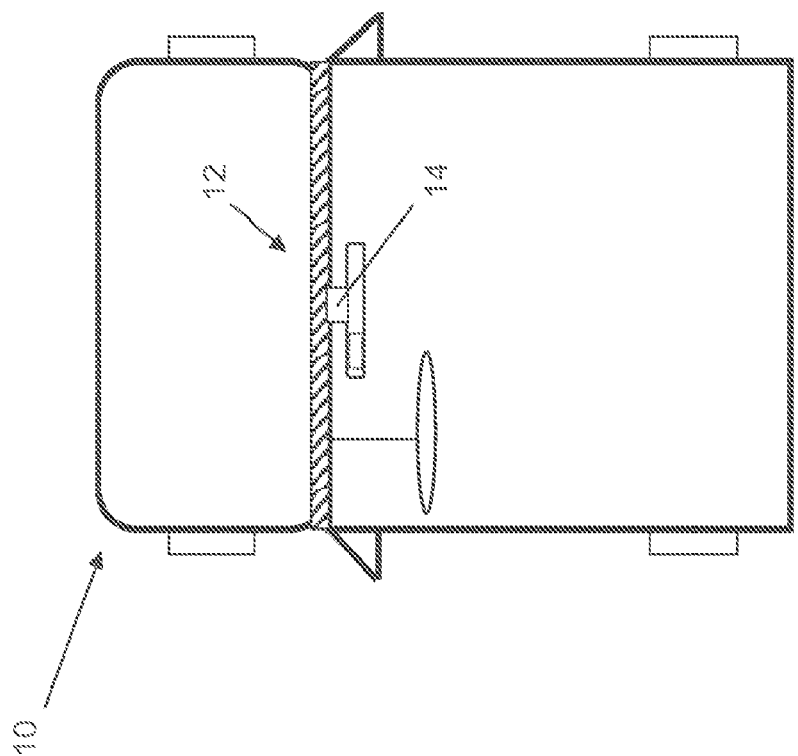
FIG. 1 is a plan view of a vehicle with a vision system and forward facing imaging sensor or camera that provides a forward exterior field of view in accordance with the present invention.

Referring now to the drawings and the illustrative embodiments depicted therein, a vehicle 10 includes an imaging system or vision system 12 that includes at least one imaging sensor or camera 14 (such as forward facing camera at the front (or at the windshield) of the vehicle), which captures images exterior of and forwardly of the vehicle (FIG. 1). The imaging system 12 is operable to process (such as via an image processor) image data captured by the camera 14 to present these on a display or to detect objects and/or headlights of approaching vehicles and/or taillights of leading vehicles in the field of view of the camera (such as for use in an object detection system of the vehicle or collision avoidance system of the vehicle or headlamp control system of the vehicle or adaptive cruise control system of the vehicle or lane change departure warning system of the vehicle or traffic sign recognition system of the vehicle or driver assistance system of the vehicle the like).

The image processor of the vision system 12 is operable to process captured image data, such as to detect and identify objects forward (and optionally sideward and/or rearward) of the vehicle during normal operation of the vehicle. In poor visibility conditions, such as foggy conditions and/or heavy snow fall conditions or the like, objects may be difficult for the driver to see and may be difficult even for the image processor to detect, even when image processing algorithms for lens pollution detection (such as similar to that described in U.S. provisional application Ser. No. 61/616,126, filed Mar. 27, 2012, which is hereby incorporated herein by reference in its entirety) come into use. For example, and with reference to image "A" in FIG. 2, during low visibility conditions, such as fog conditions as shown, it is difficult for the driver of the vehicle to detect the person and dog at the side of the road ahead of the vehicle and beyond the principal illumination area of the vehicle headlamps (set at low beams for seeing in the fog). The image processor may process the image to detect objects, but, and with reference to image "B" in FIG. 2, normal image processing may not detect the object of interest (the person and dog in this example) due to the poor visibility conditions. Typically, the object detection may not work feasibly when the image contrast falls under a certain level. In order to increase the detectability of such objects in poor visibility conditions, the vision system of the present invention is operable to enhance or increase the contrast of the captured images so that any objects in the field of view of the camera are darkened to enhance the detectability of the objects by the image processor or to ease the visibility of objects to the driver of the vehicle.

Figure 2:
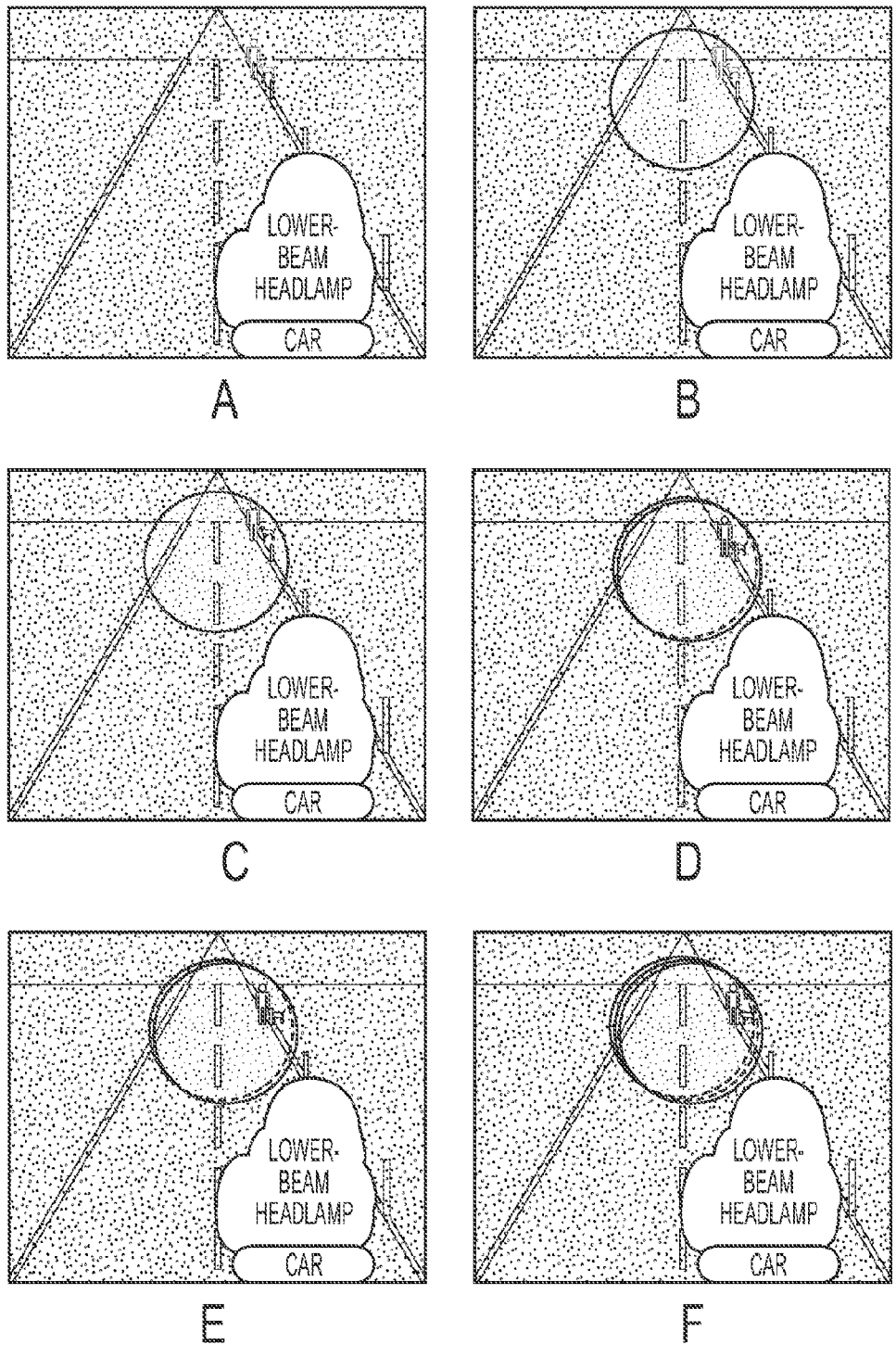
FIG. 2 shows images captured by the forward facing camera and processed by the vision system of the present invention.

As can be seen with reference to images "C" through "F" in FIG. 2, as the contrast is increased, the side markers or posts along the side of the road and the object of interest (the person and dog in this example) become darker and, in this example, the object moves relative to other fixed objects in the captured images (see images B-F in FIG. 2 and note that the person and dog approach the fixed road marker in the captured images), and thus the image processor can detect the presence of the fixed and moving objects and determine if they are objects of interest to the driver of the vehicle and generate the appropriate signal responsive to such detection and determination or identification. For example, the system, responsive to such an object detection, may generate an alert to the driver or may adjust the headlamps accordingly or may display the detected object on a display screen for viewing by the driver (particularly for backup assist systems where the object is detected rearward of the vehicle during a reversing maneuver). Thus, by increasing the contrast in captured images, the vision system can enhance detection of objects in the camera's field of view that may otherwise go undetected. The system may be operable to increase the contrast in the captured images responsive to a user input or to a detection or determination of a low visibility condition, such as responsive to a signal from a rain sensor or the like that is indicative of detection of a foggy condition or such as responsive to image processing of the captured images to determine that the vehicle is in foggy driving conditions (such as by utilizing aspects of the vision systems described in U.S. Pat. Nos. 4,973,844; 5,796,094; 5,877,897; and 6,353,392, which are hereby incorporated herein by reference in their entireties).

It is known to provide image contrast enhancing for photographs (such as photographs taken by hand held digital cameras or astronomical telescopes or the like), and such enhancements may be done by known computer based tools for editing images. Today, nearly every operating system, library, presenting program and/or the like provides at least basic image editing functions. Professional photo editing programs like CoralDRAW®, Gimp® or Adobe Photoshop® provide a wide range of image editing and enhancing features. Typically used for contrast enhancing is the editing of the contrast histogram. This can be used to expose objects stronger. A function used especially to do this is "Contrast Enhancement through Localized Histogram Equalization" (see Cromwell-intl.com: http://www.cromwell-intl.com/3d/histogram/, which is hereby incorporated herein by reference in its entirety). Even night images can become contrast enhanced in a way that low illuminated objects turn out more visible. Such algorithms used in consumer computer programs for image enhancing are typically used in individual pictures, and are not meant to be used in real time applications.

Image quality improvement in poor visibility conditions is known from airborne weather surveillance pictures for reworking pictures taken in cloudy (foggy) situations. The best results were achieved by Oakley et al. when contrast enhancement algorithm in conjunction with a temporal filters came into use (see Image Processing, IEEE; "Improving Image Quality in Poor Visibility Conditions Using a Physical Model for Contrast Degradation," http://ieeexplore.ieee.org/xpl/freeabs all.jsp?arnumber=660994, by Oakley, J. P. and Satherley, B. L., February 1998, which is hereby incorporated herein by reference in its entirety). The base was a physical model on fog reflection.

Attempts have been made to do video contrast enhancements such as in "Contrast Enhancement Using Brightness Preserving Bi-Histogram Equalization" by Yeong-Taeg Kim (Consumer Electronics: IEEE: "Contrast Enhancement Using Brightness Preserving Bi-Histogram Equalization," by Yeong-Taeg Kim, February 1997, which is hereby incorporated herein by reference in its entirety). This requires real time processing. Demand for this was and is in applications for the likes of television images, images providing medical devices, military engineering and/or the like, and Kim et al. suggested "Partially Overlapped Sub-Block Histogram Equalization" to be used in cameras (Circuits and Systems for Video Technology, IEEE: "Partially Overlapped Sub-Block Histogram Equalization" http://ieeexplore.ieee.org/xpl/freeabs all.jsp?arnumber=915354, by Joung-Youn Kim, Lee-Sup Kim and Seung-Ho Hwang, April 2001, which is hereby incorporated herein by reference in its entirety). Also, Marsi et al. were able to simplify algorithms by attempting recursive rational filters (Imaging Systems and Techniques, 2004; IEEE International Workshop: "Real Time Video Contrast Enhancement by Using Recursive Rational Filter," http://ieeexplore.ieee.org/xpl/freeabs all.jsp?arnumber=1397276, by Marsi, S., Ramponi, G. and Carrato, S., May 14, 2004, which is hereby incorporated herein by reference in its entirety), and Wang et al. suggested the use of weighted thresholded histogram equalization for fast processing (Consumer Electronics, IEEE: "Real Time Video Contrast Enhancement by using Weighted Thresholded Histogram Equalization" http://ieeexplore.ieee.org/xpl/freeabs all.jsp?arnumber=4266969, by Qing Wang and Ward, R. K., May 2007, which is hereby incorporated herein by reference in its entirety). Another challenge is the noise, a common problem on electronic cameras; Starck et al. published a procedure to do noise reduction by curvelet transforms in 2003 (Image Processing, IEEE: "Gray and Color Image Contrast Enhancement by the Curvelet Transform," http://ieeexplore.ieee.org/xpl/freeabs all.jsp?arnumber=1208320, by Starck, J.-L., Murtagh, F., Candes, E. J. and Donoho, D. L., June 2003, which is hereby incorporated herein by reference in its entirety).

It is also known to use infrared systems or low light amplifying systems in vehicles. Earlier systems have used infrared cameras alone, and some systems additionally use infrared headlights to light up the area in front of the vehicle (invisible for the human eye) which makes that area easier to detect with the infrared camera. Infrared cameras may provide enhanced performance in object detection in dense fog conditions due to its physical principal and the detected wave length have the intrinsic property to interfuse fog, so objects in fog can be detected and/or visualized.

State of the art automotive driver assistance systems typically provide the driver with useful information of the vehicle's environment, including the traffic or objects in front of, to the side of and rearward of the vehicle. Typically, there are additional warnings or image overlays for highlighting hazards, especially those in the driving direction of the vehicle and in the anticipated path of travel of the vehicle. Obstacles or pedestrians that are in the way or path of the vehicle or tend to step into the path of the vehicle may be highlighted. Systems which also do active interventions such as braking or collision avoidance maneuvers are also known. For distinguishing pedestrians from other objects and for predetermining their walking direction and speed, the detected objects need to be tracked over a certain time. Also, analyzing shapes or markers of walking or standing pedestrians is known in the field of automotive vision systems and image processing. Due to the vehicle's own movement, the objects in the captured images flow or move over successively captured images (optical flow). For example, external or outside objects (even stationary objects) move through the images taken from a front facing vehicle camera as the vehicle travels along the road. Algorithms for tracking objects under driving conditions are also known. When a vehicle drives through a turn, the optical flow also behaves in a turned manner. That turn can be anticipated by the knowledge of the steering wheel's angle and a kinematic model of the vehicle's curve behavior. The optical flow speed directly translates from the vehicle's ground speed given by the odometer. Alternatively known algorithms may determine the optical flow direct from the image flow without the previous mentioned input from the vehicle.

For enabling the above mentioned pedestrian and obstacle acknowledging and tracking algorithm to work properly, especially to be able to highlight a hazard or warn the driver or intervene (such as via braking or cruise control adjustment or the like), it is necessary to receive sufficient images. In foggy driving conditions or during heavy snow fall driving conditions, cameras in the visible spectrum deliver images of insufficient quality. The present invention provides enhanced image quality of visible spectrum cameras, especially the dynamic range of the resulting image, so that the driver assist system algorithms can work properly and/or display the processed image to the driver as an improvement to his or her view in such limited visibility conditions. This is achieved without the need of additional cameras using different light spectrums (such as infrared sensitive cameras or the like) or other sensors for the same purpose or high dynamic range (HDR) cameras.

Figure 5:
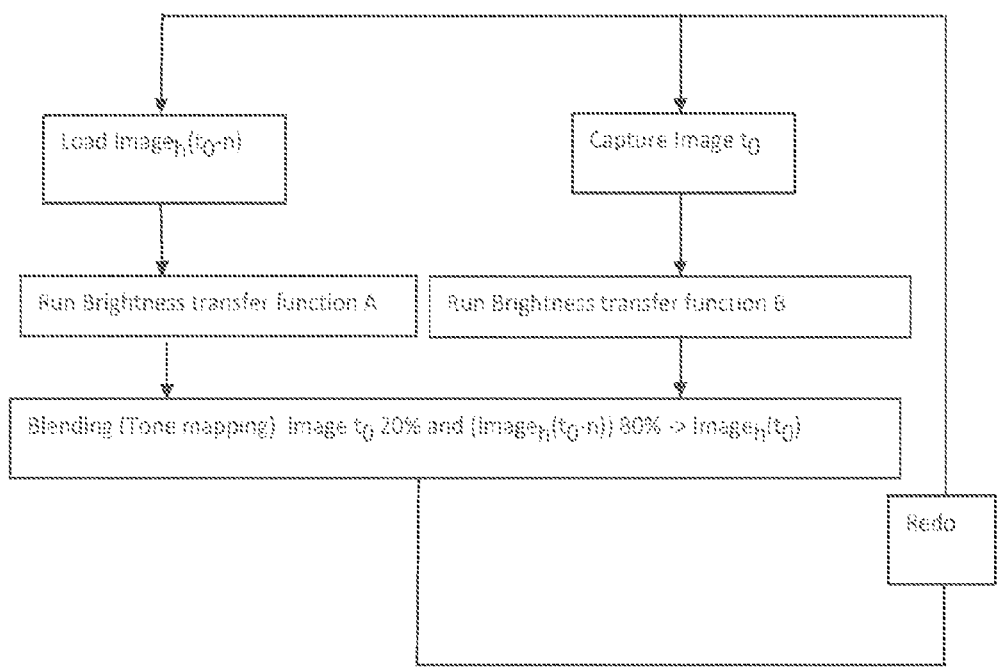
FIG. 5 shows a flow chart of the image enhancing and processing steps according the invention, and by mapping/stacking an illumination reduced image scene on top of a contrast enhanced image the dynamic range of the image increases: overexposed areas appear less bright and underexposed more bright, which leads to acknowledge details in the scene easier.
Figure 6:
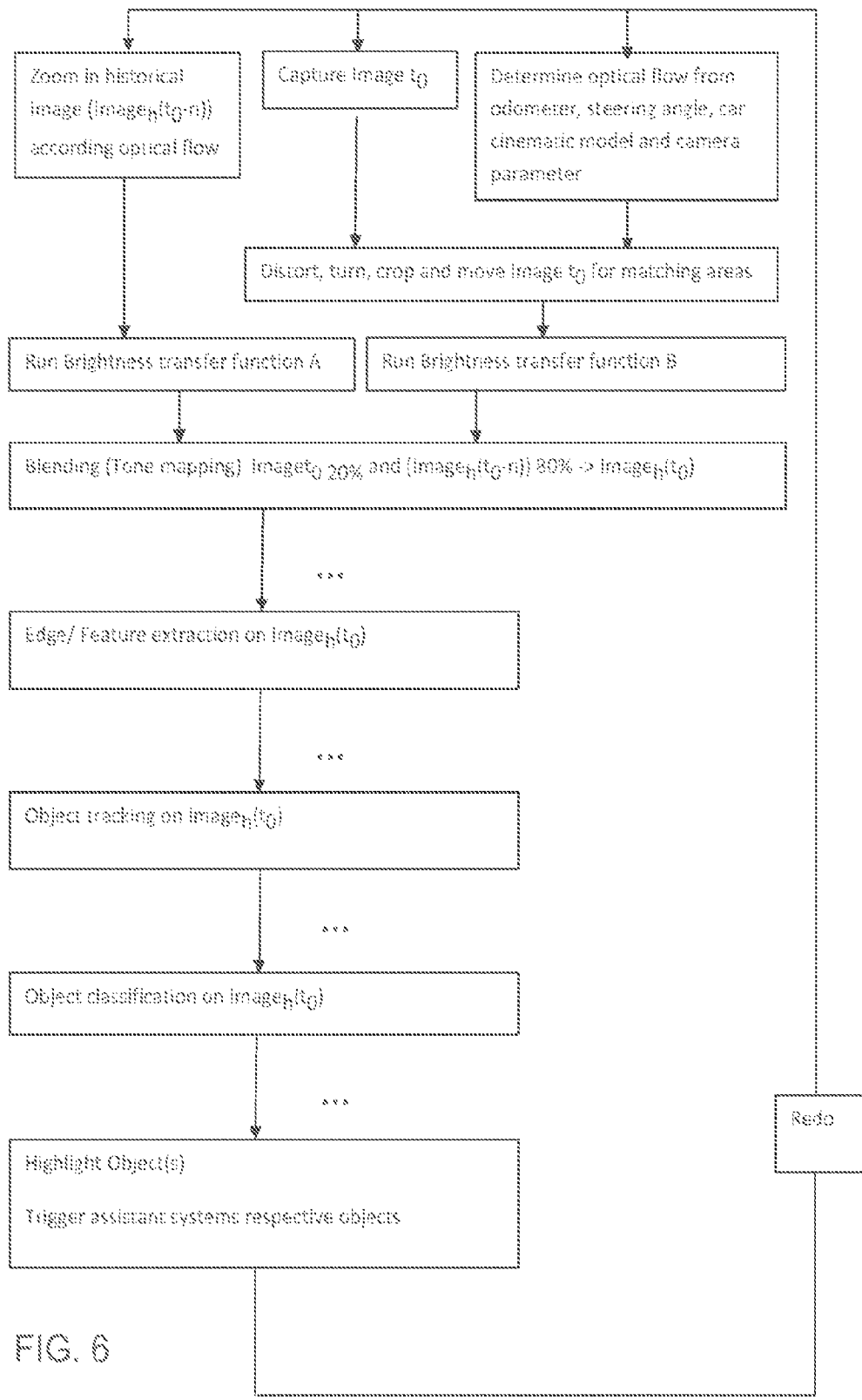
FIG. 6 shows a flow chart of the image enhancing and processing steps according the invention as to be used in a vehicle vision system, supporting machine and human vision driver assistant algorithms.

The present invention thus provides enhanced image quality in poor visibility conditions captured by a non HDR camera by amplifying the contrast details in the captured images by generating a pseudo HDR image out of current and historical image components by tone mapping. The system then tracks the contrast thresholds/features within the captured images with respect to the image flow caused by the vehicle's movement. This process is repeated on a frame-by-frame basis to detect and identify objects in the camera's forward field of view, as can be seen in FIGS. 5 and 6. At every loop the historically (previously enhanced) image (Image$_h$(t$_0$-n))) passes two individual image transfer functions and then becomes superpositioned (or mapped, merged, blended or stacked) by the currently captured frame (Image t$_0$)). This tone mapping method is called image stacking, exposure fusion or exposure blending. The mapping ratio of how much of the historical image (Image$_h$(t$_0$-n))) becomes kept and how much of the current image (Image t$_0$)) becomes mapped in is freely selectable between 0 and 1. In the example in FIG. 5, 20%/80% was chosen for a data frame rate of 30 frames per second. Slower frame rates might require a shift into a stronger influence of (Image t$_0$)). The used image enhancements shall not be limited to these shown in the example of FIGS. 5 and 6.

Figure 4B:
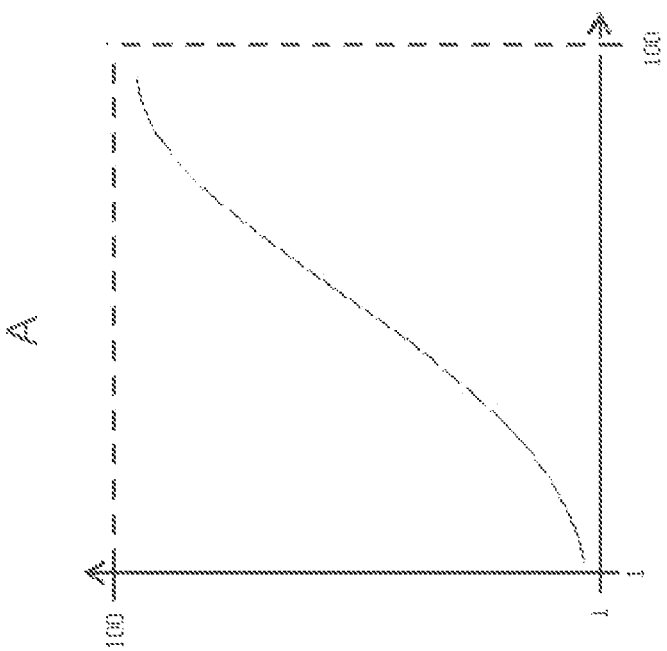
FIGS. 4(a) and 4(b) show graphs of brightness transfer functions A (FIG. 4(a)) and B (FIG. 4(b)) which find use in the flow chart of FIGS. 5 and 6, with the brightness transfer function A enhancing the brighter areas and dampening the darker ones, and with the brightness transfer function B decreasing the medium illuminated areas, and with the upper end at less of 100, whereby the overall illumination becomes decreased by this transfer function.
Figure 4A:
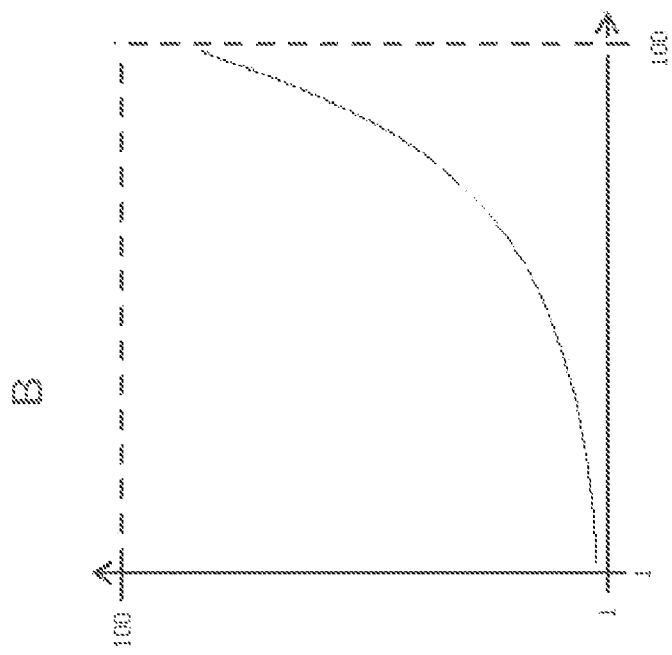
Figure 7:
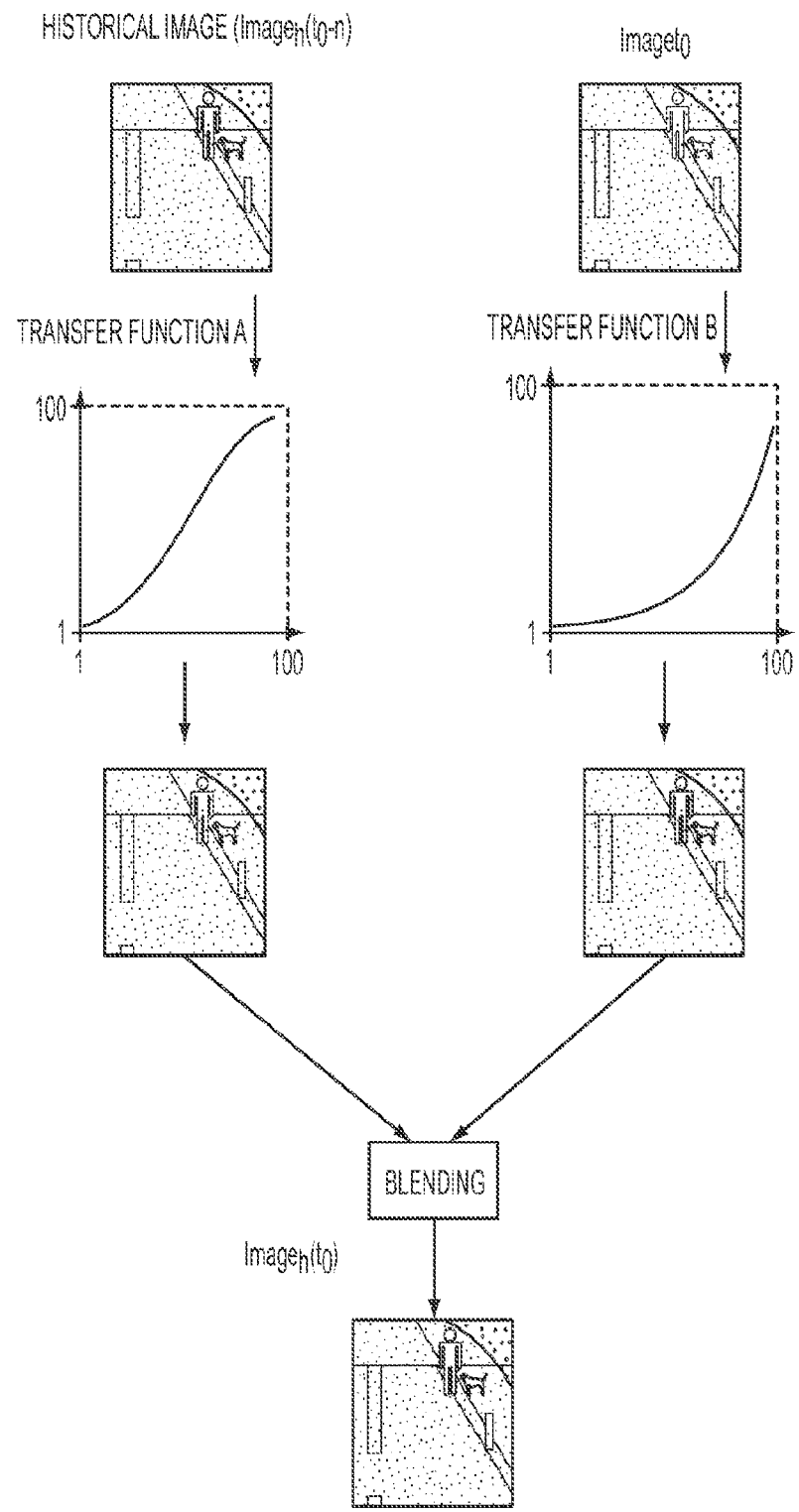
FIG. 7 shows an example of how images may be altered when processed according to the flow chart of FIG. 5, whereby it becomes apparent that the process turns out more contrasts of possible objects on foggy weather conditions when comparing Image($t_o$) and Image$_h$($t_o$).

The brightness transfer function A (FIG. 4(a)) enhances the brighter areas and dampens the darker ones. This equates to a histogram spread (Dynamic Range Increase), such as shown in FIGS. 3(a) and 3(b), of the historically image (Image$_h$(t$_0$-n))). The brightness transfer function B (FIG. 4(b)) decreases the medium illuminated areas of the currently captured image (Image t$_0$)). The upper end is at less than 100%. The overall illumination becomes decreased by this transfer function. FIG. 7 shows that already after this step the discrimination between the object (person with dog) and surrounding (foggy) area is improved. By mapping/stacking an illumination reduced image scene (currently captured images) on top of a contrast enhanced image (historical image), the dynamic range of the image increases as to be seen in FIGS. 3(a) and 3(b). Overexposed areas appear less bright and underexposed more bright which leads to acknowledge details in the scene easier (see FIG. 7). After consecutive loops it may come to a blooming effect or halo at the borderline of areas with high contrast. This effect may be enhanced by some blurring which is caused by unavoidable inaccuracy of the distorting, turning, cropping and moving of the currently captured image to the historical scene.

The result of this image processing and tracking of the features with respect to the optical flow and the vehicle movement is shown in principle in FIG. 2 (and discussed above). The algorithm based on already established image processing procedures (non automotive, image enhancements of photographs and 'image registration' and the like), such as tonal value splitting/-buckling/-limiting, histogram equalization and the like, as simplified can be seen with reference to FIGS. 3(a) and 3(b).

Because the yet to be processed images are captured by a camera on a moving vehicle, it is necessary that the optical flow and the according information or data of objects (both steady or moving) moving through the images, including the vehicle speed, the steering angle of the vehicle and the like, be taken into account. There may be a model of the vehicle's cinematic mathematical equations. Its results may be stored in a look up table. The camera's or cameras parameters as like mounting position and viewing angle optical properties may be reflected in that (combined) look up table or in another mathematical model or table. The moving objects/obstacles can thus be distinguished from steady objects relative to the movement of the vehicle that is equipped with the camera system or vision system of the present invention. Object classification may work on further distances by feeding enhanced image data. Further algorithms may process the image data and may indicate hazards or the like, and/or may actively intervene to avoid collisions and the like. The image enhancing algorithm may find use in processing multiple camera images separate or by processing a stitched image which may be arranged as a vehicle top view image or the like.

The imaging sensor and its photosensor array may comprise any suitable camera or sensing device, such as, for example, an array of a plurality of photosensor elements arranged in 640 columns and 480 rows (a 640×480 imaging array), with a respective lens focusing images onto respective portions of the array. The photosensor array may comprise a plurality of photosensor elements arranged in a photosensor array having rows and columns. The logic and control circuit of the imaging sensor may function in any known manner, such as in the manner described in U.S. Pat. Nos. 5,550,677; 5,877,897; 6,498,620; 5,670,935; 5,796,094; and/or 6,396,397, and/or U.S. provisional applications, Ser. No. 61/696,416, filed Sep. 4, 2012; Ser. No. 61/682,995, filed Aug. 14, 2012; Ser. No. 61/682,486, filed Aug. 13, 2012; Ser. No. 61/680,883, filed Aug. 8, 2012; Ser. No. 61/678,375, filed Aug. 1, 2012; Ser. No. 61/676,405, filed Jul. 27, 2012; Ser. No. 61/666,146, filed Jun. 29, 2012; Ser. No. 61/653,665, filed May 31, 2012; Ser. No. 61/653,664, filed May 31, 2012; Ser. No. 61/648,744, filed May 18, 2012; Ser. No. 61/624,507, filed Apr. 16, 2012; Ser. No. 61/616,126, filed Mar. 27, 2012; Ser. No. 61/615,410, filed Mar. 26, 2012; Ser. No. 61/613,651, filed Mar. 21, 2012; Ser.

No. 61/607,229, filed Mar. 6, 2012; Ser. No. 61/605,409, filed Mar. 1, 2012; Ser. No. 61/602,878, filed Feb. 24, 2012; Ser. No. 61/602,876, filed Feb. 24, 2012; Ser. No. 61/600, 205, filed Feb. 17, 2012; Ser. No. 61/588,833, filed Jan. 20, 2012; Ser. No. 61/583,381, filed Jan. 5, 2012; Ser. No. 61/579,682, filed Dec. 23, 2011; Ser. No. 61/570,017, filed Dec. 13, 2011; Ser. No. 61/568,791, filed Dec. 9, 2011; Ser. No. 61/567,446, filed Dec. 6, 2011; Ser. No. 61/559,970, filed Nov. 15, 2011; and/or Ser. No. 61/552,167, filed Oct. 27, 2011, and/or PCT Application No. PCT/CA2012/ 000378, filed Apr. 25, 2012, and/or PCT Application No. PCT/US2012/056014, filed Sep. 19, 2012, and/or PCT Application No. PCT/US2012/048800, filed Jul. 30, 2012, and/or PCT Application No. PCT/US2012/048110, filed Jul. 25, 2012, and/or U.S. patent application Ser. No. 13/534, 657, filed Jun. 27, 2012, which are all hereby incorporated herein by reference in their entireties. The system may communicate with other communication systems via any suitable means, such as by utilizing aspects of the systems described in PCT Application No. PCT/US10/038477, filed Jun. 14, 2010, and/or U.S. patent application Ser. No. 13/202,005, filed Aug. 17, 2011, and/or U.S. provisional applications, Ser. No. 61/650,667, filed May 23, 2012; Ser. No. 61/579,682, filed Dec. 23, 2011; Ser. No. 61/565,713, filed Dec. 1, 2011, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and 6,824,281, and/or International Publication No. WO 2010/099416, published Sep. 2, 2010, and/or PCT Application No. PCT/US10/47256, filed Aug. 31, 2010, and/or U.S. patent application Ser. No. 12/508,840, filed Jul. 24, 2009, and published Jan. 28, 2010 as U.S. Pat. Publication No. US 2010-0020170; and/or PCT Application No. PCT/US2012/048110, filed Jul. 25, 2012, and/or U.S. patent application Ser. No. 13/534,657, filed Jun. 27, 2012, which are all hereby incorporated herein by reference in their entireties. The camera or cameras may comprise any suitable cameras or imaging sensors or camera modules, and may utilize aspects of the cameras or sensors described in U.S. patent applications, Ser. No. 12/091,359, filed Apr. 24, 2008 and published Oct. 1, 2009 as U.S. Publication No. US-2009-0244361; and/or Ser. No. 13/260,400, filed Sep. 26, 2011, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580; and/or 7,965, 336, and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149; and/or 7,526, 103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877, 897; 5,949,331; 6,222,447; 6,302,545; 6,396,397; 6,498, 620; 6,523,964; 6,611,202; 6,201,642; 6,690,268; 6,717, 610; 6,757,109; 6,802,617; 6,806,452; 6,822,563; 6,891, 563; 6,946,978; and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149; and/or U.S. patent applications, Ser. No. 11/226,628, filed Sep. 14, 2005 and published Mar. 23, 2006 as U.S. Publication No. US-2006-0061008, and/or Ser. No. 12/578,732, filed Oct. 14, 2009, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308, 341; 7,289,037; 7,249,860; 7,004,593; 4,546,551; 5,699, 044; 4,953,305; 5,576,687; 5,632,092; 5,677,851; 5,708, 410; 5,737,226; 5,802,727; 5,878,370; 6,087,953; 6,173, 508; 6,222,460; 6,513,252; and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/ 028686, and/or PCT Application No. PCT/US11/62755, filed Dec. 1, 2011 and published Jun. 7, 2012 as International Publication No. WO 2012-075250, and/or PCT Application No. PCT/US2012/048993, filed Jul. 31, 2012, and/or PCT Application No. PCT/CA2012/000378, filed Apr. 25, 2012, and/or U.S. patent application Ser. No. 13/333,337, filed Dec. 21, 2011, and/or U.S. provisional applications, Ser. No. 61/615,410, filed Mar. 26, 2012; Ser. No. 61/588, 833, filed Jan. 20, 2012; Ser. No. 61/570,017, filed Dec. 13, 2011; Ser. No. 61/568,791, filed Dec. 9, 2011; Ser. No. 61/559,970, filed Nov. 15, 2011; Ser. No. 61/540,256, filed Sep. 28, 2011, which are hereby incorporated herein by reference in their entireties.

Optionally, the video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,338,177; 7,274,501; 7,255,451; 7,195,381; 7,184,190; 5,668,663; 5,724,187 and/or 6,690,268, and/or in U.S. patent applications, Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036; and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

The display or displays may comprise a video display and may utilize aspects of the video display devices or modules described in U.S. Pat. Nos. 6,690,268; 7,184,190; 7,274, 501; 7,370,983; 7,446,650; and/or 7,855,755, and/or U.S. patent application Ser. No. 10/538,724, filed Jun. 13, 2005 and published Mar. 9, 2006 as U.S. Publication No. US-2006-0050018, which are all hereby incorporated herein by reference in their entireties. The video display may be operable to display images captured by one or more imaging sensors or cameras at the vehicle.

Changes and modifications to the specifically described embodiments may be carried out without departing from the principles of the present invention, which is intended to be limited only by the scope of the appended claims as interpreted according to the principles of patent law.

The invention claimed is:

1. A vision system for a vehicle, said vision system comprising:
   an imaging sensor disposed at the vehicle and having an exterior field of view, said imaging sensor capturing image data;
   an image processor operable to process successive frames of captured image data;
   wherein, responsive to a determination of a low visibility driving condition, said image processor increases contrast of features in the captured image data by brightening brighter areas and dampening darker areas of the captured image data, and wherein said image processor increases contrast of features in the captured image data over multiple successive frames of captured image data to enhance discrimination of objects present in the field of view of said imaging sensor; and
   wherein said vision system, via image processing of multiple successive frames of captured image data during a determined low visibility driving condition, tracks, from frame to frame, image flow of features caused by movement of the vehicle to enhance detection and identification of objects present in the exterior field of view of said imaging sensor.

2. The vision system of claim 1, wherein said image processor processes captured image data to determine a low visibility driving condition.

3. The vision system of claim 2, wherein said image processor is operable to determine that fog is present in the field of view of said imaging sensor.

4. The vision system of claim 1, wherein said image processor executes a first brightness transfer function on frames of captured image data to enhance contrast of features in captured image data to enhance discrimination of objects present in the field of view of said imaging sensor.

5. The vision system of claim 4, wherein said image processor executes a second brightness transfer function on other frames of captured image data.

6. The vision system of claim 5, wherein said image processor executes tone mapping of multiple frames of captured image data to generate a contrast enhanced output image to enhance discrimination of objects in the field of view of said imaging sensor.

7. The vision system of claim 6, wherein said image processor tracks a detected object over successive frames of captured image data to determine if the detected object is an object of interest in the field of view of said imaging sensor.

8. The vision system of claim 1, wherein said image processor, during processing of captured image data, is responsive at least in part to at least one of a vehicle speed and a vehicle steering angle.

9. The vision system of claim 8, wherein said image processor distinguishes moving objects from non-moving objects responsive at least in part to at least one of a vehicle speed and a vehicle steering angle.

10. The vision system of claim 1, comprising a display for displaying images derived from image data captured by said imaging sensor for viewing by a driver of the vehicle when normally operating the vehicle.

11. The vision system of claim 10, comprising a plurality of imaging sensors disposed at the vehicle and having respective exterior fields of view and capturing image data, wherein said display displays images derived from image data captured by imaging sensors of said plurality of imaging sensors.

12. The vision system of claim 10, wherein said imaging sensor is disposed at a rear portion of the vehicle and has an exterior field of view rearward of the vehicle, and wherein said display displays images derived from image data captured by said imaging sensor during a reversing maneuver of the vehicle.

13. A vision system for a vehicle, said vision system comprising:
a plurality of imaging sensors disposed at the vehicle and having respective exterior fields of view, wherein individual imaging sensors of said plurality of imaging sensors capture image data;
wherein said imaging sensors comprise CMOS imaging sensors;
an image processor operable to process successive frames of captured image data;
wherein, responsive to a determination of a low visibility driving condition, said image processor increases contrast of features in captured image data by brightening brighter areas and dampening darker areas of the captured image data, and wherein said image processor increases contrast of features in the captured image data over multiple successive frames of captured image data to enhance discrimination of objects present in the fields of view of said imaging sensors;
wherein said vision system, via image processing of multiple successive frames of captured image data during a determined low visibility driving condition, tracks, from frame to frame, image flow of features caused by movement of the vehicle to enhance detection and identification of objects present in the exterior field of view of said imaging sensor;
a display for displaying images derived from image data captured by said imaging sensors for viewing by a driver of the vehicle when normally operating the vehicle; and
wherein said display displays images derived from image data captured by said imaging sensors.

14. The vision system of claim 13, wherein said image processor processes captured image data to determine that fog is present in the field of view of at least one of said imaging sensors.

15. The vision system of claim 13, wherein said image processor executes a first brightness transfer function on frames of captured image data to enhance contrast of features in image data captured by one of said imaging sensors, and wherein said image processor executes a second brightness transfer function on other frames of image data captured by said one of said imaging sensors.

16. The vision system of claim 13, wherein said image processor executes tone mapping of multiple frames of captured image data to generate a contrast enhanced output image to enhance discrimination of objects in the field of view of one of said imaging sensors, and wherein said image processor tracks a detected object over successive frames of captured image data to determine if the detected object is an object of interest in the field of view of said one of said imaging sensors.

17. A vision system for a vehicle, said vision system comprising:
an imaging sensor disposed at a rear portion of the vehicle and having an exterior field of view rearward of the vehicle, wherein said imaging sensor captures image data;
wherein said imaging sensor comprises a CMOS imaging sensor;
an image processor operable to process successive frames of captured image data;
wherein, responsive to a determination of a low visibility driving condition, said image processor increases contrast of features in captured image data by brightening brighter areas and dampening darker areas of the captured image data, and wherein said image processor increases contrast of features in the captured image data over multiple successive frames of captured image data to enhance discrimination of objects present in the field of view of said imaging sensor;
wherein said vision system, via image processing of multiple successive frames of captured image data during a determined low visibility driving condition, tracks, from frame to frame, image flow of features caused by movement of the vehicle to enhance detection and identification of objects present in the exterior field of view of said imaging sensor;
a display for displaying images derived from image data captured by said imaging sensor for viewing by a driver of the vehicle when normally operating the vehicle; and
wherein said display displays images derived from captured image data during a reversing maneuver of the vehicle.

18. The vision system of claim 17, wherein said image processor processes captured image data to determine that fog is present in the field of view of said imaging sensor.

19. The vision system of claim 17, wherein said image processor executes a first brightness transfer function on frames of captured image data and wherein said image processor executes a second brightness transfer function on other frames of captured image data.

20. The vision system of claim 17, wherein said image processor executes tone mapping of multiple frames of captured image data to generate a contrast enhanced output image to enhance discrimination of objects in the field of view of said imaging sensor, and wherein said image processor tracks a detected object over successive frames of captured image data to determine if the detected object is an object of interest in the field of view of said imaging sensor.

* * * * *